Inventor
MARK MANDEL
By [signature]
Attorney

Nov. 10, 1959 M. MANDEL 2,912,691
RADIO NAVIGATION RECEIVER
Filed April 4, 1958 2 Sheets-Sheet 2

Inventor
MARK MANDEL
By
Attorney

United States Patent Office 2,912,691
Patented Nov. 10, 1959

2,912,691

RADIO NAVIGATION RECEIVER

Mark Mandel, Bloomfield, N.J., assignor to International Telephone and Telegraph Corporation, Nutley, N.J., a corporation of Maryland Application April 4, 1958, Serial No. 726,463

14 Claims. (Cl. 343—106)

This invention relates to a navigation system and more particularly to a radio navigation receiver providing positive feedback control.

In the aerial navigation system known as TACAN, there are included pulse-emitting beacon or ground transmitters and mobile station receivers, such as, for example, those carried on airplanes. The transmitting antenna system in the beacon produces a multilobed directional pattern rotating at about 15 cycles per second. To a receiver receiving these pulse signals from the transmitter, the rotation of the antenna pattern produces an amplitude modulation envelope on these pulses, the phase of which envelope varies at different azimuthal angles from the beacon station. When the major lobe of the directional pattern points in a given direction, such as north, a special signal in the form of a short burst of pulses is transmitted from the beacon, which signal is referred to as the "north" or "main" reference signal. By comparing the phase of the modulation envelope (due to rotation of the beacon pattern) with that of the north signal, an indication of the bearing of the receiver with respect to the beacon is obtained. If only the north signal and a single-lobe directional pattern are employed, only a relatively coarse indication of bearing would be obtainable. To obtain a finer indication, the directional pattern is multilobed with each lobe separated, for example, by 40 degrees from the next and with auxiliary reference pulse signals in the form of short bursts of pulses being emitted each time one of these lobes passes the predetermined reference point (i.e., the north) as the pattern is rotated. The rotation of this pattern produces a modulation envelope of 135 cycles per second (9 lobes multiplied by 15 cycles per second) on top of the fundamental of 15 cycles per second due to the main directive lobe. At the receiver, the phase of the auxiliary pulse signals is compared with respect to that of the 135 cycle-per-second modulation envelope; and a fine indication is thereby obtained in addition to the coarse one.

Actually in TACAN the coarse indication of bearing gives the 40-degree sector of the azimuthal angle of the mobile receiver with respect to the beacon; and the more precise angle is found by the comparison of the auxiliary reference pulse signals with the corresponding 135 cycle-per-second wave. A 40-degree sector is found and thereafter maintained by a searching and tracking operation involving the main reference pulse and the 15 cycle-per-second wave. For this purpose, the incoming pulses which carry the amplitude modulation of the 15 cycle-per-second envelope are filtered to derive a 15 cycle-per-second wave. This wave is then phase shifted by continuously increasing amounts; and from the phase-shifted wave, there is then produced a 40° gating pulse which is therefore likewise continuously phase shifted and is applied to a coincidence circuit to which the main reference pulse is also applied.

During the condition of non-coincidence between the 40-degree gate pulse and the main reference pulse, the 40-degree gate pulse is continuously phase shifted to the point of coincidence with the main reference pulse. In accordance with the present invention, a considerable reduction in the time it takes to approach this coincidence condition is achieved by providing a positive feedback voltage to the motor control circuit. This allows the pilot to obtain his bearing indication in a shorter time.

The outputs of the balanced phase comparator in the receiver produce two "null" conditions 180 degrees out of phase with each other. When the "null" conditions are attained, the output voltages of the phase comparators are at a minimum. One of these "null" conditions corresponds to a stable equilibrium position of the bearing indicator motor. This condition produces a corrective action to the motor causing it to return to the correct phasing position. But the other "null" condition which corresponds to the unstable equilibrium position of the bearing indicator motor produces a voltage causing the rotation of this motor to go in a direction away from the correct phasing position. However, this incorrect phasing position also produces a minimum voltage corresponding to a "null" condition, therefore making it possible to obtain a false indication of bearing. But according to the present invention, the use of a positive voltage during this unstable condition of operation provides the drive motor with a voltage great enough to drive it past this unstable position, thus preventing any false indications of bearing corresponding to the unstable "null" condition.

As the bearing indicator motor approaches its final "null" position during "fine" operation, the inertia of the motor tends to drive it past the "null" position resulting in a condition of "hunting." In order to prevent this "hunting" condition, the bearing indicator motor is provided with a negative feedback voltage which will eliminate "hunting" and prevent over-travel of the bearing indicator motor as it approaches the final "null" position.

An object of the present invention therefore is the provision of an improved radio navigation receiver which enables the pilot to obtain bearing indications in a shorter period of time than with prior systems, and to prevent the pilot from receiving false indications of bearings.

A further object of the present invention is the provision of a negative feedback voltage which will prevent "hunting."

A feature of this invention is the provision of a feedback generator circuit which is composed of a generator and feedback transformer that will cause a positive feedback voltage from the motor control circuit to be fed to the bearing indicator motor during "coarse" operation. This positive feedback voltage will cause an acceleration of the bearing indicator motor, and also result in a considerable decrease in the time it would take for the receiver to obtain coincidence between the 15 cycle-per-second component which is formed into a 40-degree gating pulse and the main reference pulse if said positive feedback circuit were omitted; and further to drive the bearing indicator motor past the aforementioned unstable position.

A further feature of the present invention is the provision of a negative feedback voltage to be applied by the feedback generator circuit and motor control circuit to the bearing indicator motor during "fine" operation. This negative feedback voltage will prevent "hunting" and therefore stabilize the operation of the receiver system as it approaches its final "null" position.

The above-mentioned and other features and objects of this invention will become more apparent by reference to the following description taken in conjunction with the accompanying drawings, in which.

Figure 1:
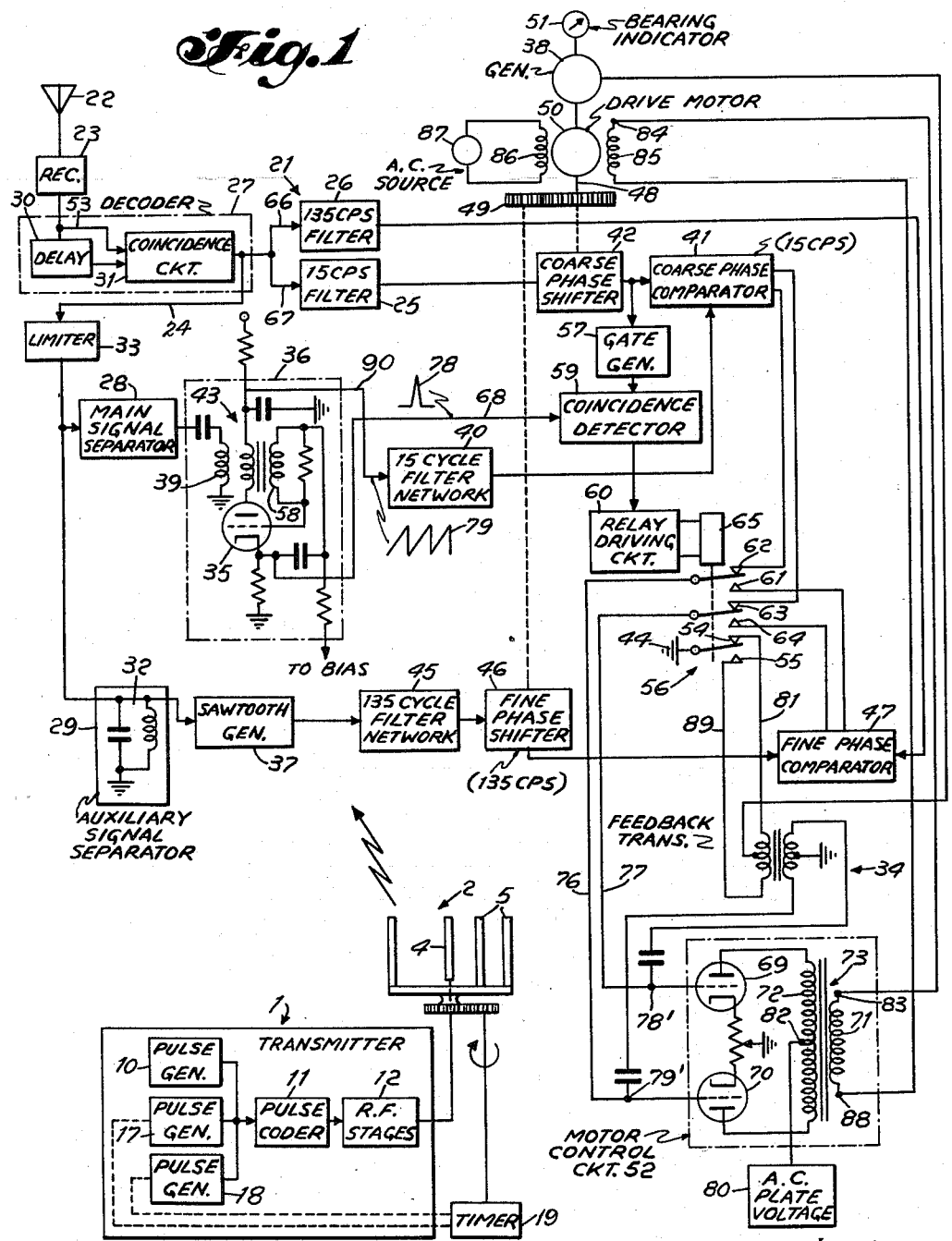
Fig. 1 is a simplified block diagram of a TACAN beacon transmitter and associated mobile receiver.
Figure 2:
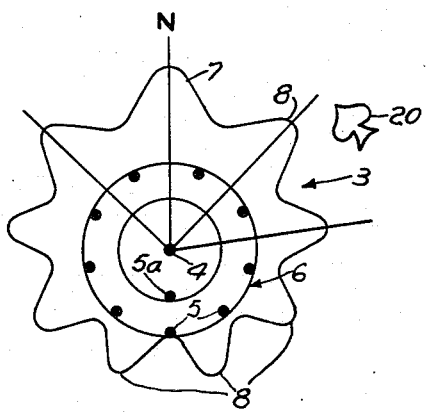
Fig. 2 is a diagram of the radiation pattern of the antenna of the beacon.

Referring to Fig. 1, a beacon station 1 emits pulses from its rotating antenna 2 according to a multilobed directional pattern 3, such as shown in Fig. 2. The pattern is rotated at the rate of 15 cycles per second. The antenna system may consist of a central omnidirectional antenna 4 with passive reflectors 5 spaced thereabout at 40 degrees separation, Fig. 2, and an additional single reflector 5a, the reflectors being, for example, printed on a pair of cylinders 6 which rotate around the central radiator 4, the pattern consisting of a major lobe or directional configuration 7 produced by 5a with minor lobes 8 produced by reflectors 5 spaced every 40 degrees therefrom. For a more detailed understanding of antenna 2, reference should be made to the Pickles-Karpeles Patent No. 2,803,821, issued August 20, 1957.

Semi-random pulses are generated by a pulse generator 10 in the beacon which may be, for example, a free-running multivibrator. These pulses, generated at about 2700 per second before transmission, are applied to a pulse coder 11, which changes each single pulse into a pair of pulses spaced 12 microseconds apart. The pulses from the coder 11 are used to key or modulate an R.-F. oscillator in an R.-F. section 12 which may also include various amplifier stages. The R.-F. pulses are then fed to the antenna system 2 from whence they are emitted according to the directional pattern 3 of Fig. 2. The rotation of the antenna reflectors, in effect, produces an amplitude modulation envelope 13 on the pulses with a maximum amplitude peak 14a corresponding to the maximum lobe 7 and the other peaks 14b corresponding to the minor lobes 8. The multilobed antenna pattern which is rotating at 15 cycles per second produces a modulation envelope of 135 cycles per second (9 lobes multiplied by 15 c.p.s.) on top of the fundamental of 15 c.p.s.

Figure 3:
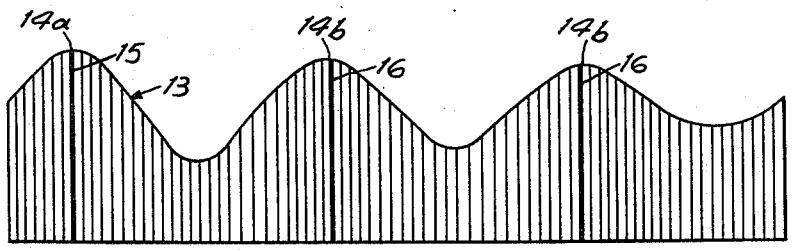
Fig. 3 is a curve showing the effective amplitude modulation envelope of the pulses transmitted from the beacon.

As the antenna system 2 rotates causing the major lobe 7 to pass a given reference direction, such as north, a reference pulse signal is emitted which is called hereinafter the "main" or "north" reference signal 15. While main signal 15 is shown as a solid black line in Fig. 3, it actually consists of a number of pulses closely spaced together in a unique pattern for identification. As each minor lobe 8 passes the reference direction, remembering that the minor lobes are spaced by 40 degrees from each other and from the north lobe, an "auxiliary" reference signal 16 is emitted. This, likewise, is shown in Fig. 3 as a solid black line, but actually consists of a unique series of pulses closely spaced together. The main reference signals 15 may be produced by a pulse generator 17 which produces 12 pulses separated by 30 microseconds, which pulses are applied to the pulse coder 11 thereby producing 12 pulse pairs, or 24 pulses, with the spacing between the pulses of a pair being 12 microseconds. The auxiliary reference signals 16 may be generated by a generator 18 producing a burst of 6 pulses, separated 24 microseconds apart (from leading edge to leading edge), which are fed from the generator 18 into the pulse coder 11 where the 6 pulses are then doubled to become 6 pairs of pulses, or 12 pulses, with a 12-microsecond spacing between adjacent pulses.

Generators 17 and 18 may consist of conventional pulse generators feeding tapped delay lines or ringing circuits to produce a desired number of pulses with the proper spacing for the north or auxiliary reference groups as described above. Suitable timing means 19, which can take any one of various forms well known in the art, may be associated with the antenna system 2 and pulse generators 17 and 18 to cause the north and auxiliary reference signals to be emitted at the proper time.

The emitted pulses are received on a receiver located in a mobile vehicle 20 (Fig. 2) such as an airplane. The signal is picked up on an omnidirectional antenna 22 and fed to a receiver 23, which removes the R.-F. envelope and detects the signal to produce amplitude modulated signals which contain the following four components:

(1) The 15 cycle-per-second envelope component.
(2) The 135 cycle-per-second envelope component.
(3) The main or north reference signal component.
(4) The auxiliary reference signal component.

The output of receiver 23 is fed into decoder 27 which consists essentially of a coincidence circuit 31 to which the input pulses are fed directly along line 53, the pulses, likewise, being fed to said coincidence circuit 31 through a delay device 30 having a delay of 12 microseconds. The coincidence circuit 31 produces an output when a delay pulse coincides with an input pulse directly applied thereto.

The aforementioned components are separated as follows. The output of coincidence circuit 31 is then fed via line 66 and line 67 to two filters 25 and 26. The 15 cycle-per-second component, which is the component produced by the major lobe for each rotation, is separated from the amplitude modulated envelope by filter 25. The 135 cycle-per-second component, which is the component produced by the 40-degree minor lobe components, is separated from the amplitude modulated envelope by filter 26.

To separate the main and auxiliary reference signals, the output of coincidence circuit 31 is also fed to an amplifier and limiter circuit 33 via line 24, which removes the audio amplitude modulation therefrom. The output of limiter circuit 33 is then fed to a main signal separation circuit 28 and an auxiliary signal separation circuit 29, each of which includes a ringing circuit 32. The ringing circuit of the main signal separator 28 is tuned to approximately 33 kilocycles to respond to the north signal pulses which are separated by 30 microseconds. The ringing circuit 32 of auxiliary signal separator 29 is tuned to approximately 83 kilocycles to respond to the auxiliary signal pulses obtained from the decoder 27, which are separated by 12 microseconds. Pulses whose spacing does not correspond to the repetition frequency to which the various ringing circuits are tuned, will not produce oscillations of sufficient amplitude to produce indications. For this purpose a threshold device may be incorporated either in said separators or in the circuits to which their outputs are connected.

The receiver 21 provides for both coarse and fine operations. In coarse operation the output of main signal separator 28 is fed into winding 39 of transformer 43, which is the input circuit of driven blocking oscillator 36. Tube 35 is normally non-conducting. Winding 58 of transformer 43 is connected so as to place a positive pulse on the grid of tube 35 which brings the tube in the conducting region and, in turn, initiates the regenerative action. The regenerative action produces a sharp leading edge on pulse 78 as illustrated in Fig. 1. Tube 35 is cut off by the bias voltage supplied from the bias supply of blocking oscillator 36, in the absence of an output from main signal separator 28. The output pulse 78 derived from the cathode of tube 35 is fed to coincidence detector 59 via line 68, whereas the output pulse 79 of the plate circuit of tube 35 is fed via line 90 to filter 40. This filter extracts an output wave having the same repetition frequency as the fundamental 15 cycle-per-second component. This output wave is then fed into phase comparator 41 where it is compared to the fundamental 15 cycle-per-second component derived from the filter 25. The fundamental 15 cycle-per-second component is continuously varied by phase shifter 42. In addition, the output of phase shifter 42 is then used to trigger a gate pulse generator 57, which will produce a gate pulse of 40 degrees duration (when 360 degrees is the period of one rotation of the multilobed directional pattern). Gate pulse generator 57 is essentially a conventional plate coupled monostable multivibrator. Coincidence between the 40-degree gate pulse produced by generator 57 and the main reference pulse which is coupled via the cathode of tube 35 is detected in coincidence detector 59 to produce an output.

The output of coincidence detector 59 is fed into a relay driving circuit 60 which energizes coil 65. The relay driving circuit 60 may consist of a tube arrangement having the relay coil located in its plate circuit. When the output of coincidence detector 59 is fed into this tube, plate current will begin to flow in coil 65 and activate the relay 56. The system is in coarse operation, prior to coincidence between the 40-degree gate pulse and the main reference pulse. With relay 56 in its de-energized position as shown, the voltage produced by phase comparator 41 is applied via contacts 62 and 63 and armature 44 of relay 56 to a motor control circuit 52 via lines 76 and 77.

Motor control circuit 52 has two tubes, 69 and 70, connected in push-pull with a transformer 73 across the outputs thereof. The output of phase comparator 41 is dependent upon the phase relation between the 15 cycle-per-second component and the main reference pulse. As the azimuth location of the aircraft changes, the phase relation between the 15 cycle-per-second component and the main reference pulse changes. The phase shifter 42 continuously varies the 15 cycle-per-second component in such a direction as to produce a "null" in the output of phase comparator 41. When this "null" is reached, the motor control circuit 52 will have a minimum output representing a balanced condition in primary winding 72 causing drive motor 50 to come to rest. This position will be indicative of the "coarse" indication of bearing and is indicated on bearing indicator 51. In addition, during coarse operation a positive feedback voltage is fed to drive motor 50 via generator 38, feedback transformer 34 and motor control circuit 52. This positive feedback voltage causes drive motor 50 to speed in the direction it is moving, thus allowing coincidence between the 40-degree gate pulse and the main reference pulse to occur in less time than would ordinarily be required without this positive feedback voltage.

The positive feedback voltage is obtained when the following conditions are fulfilled. During coarse operation, relay 56 is in its de-energized position shown in the drawing. In this position, armature 44 applies a ground to contact 54. This ground is applied via line 81 to the primary of feedback transformer 34. At substantially the same time, generator 38 applies a voltage to the center tap of feedback transformer 34, and due to transformer action a voltage is applied to points 78' and 79'. The alternating current plate voltage to tubes 69 and 70 of motor control circuit 52 is applied from plate supply 80 to the center tap (point 82) of the primary of transformer 73. In order to have a condition of positive feedback, the instantaneous polarity of the voltages at point 78' and at point 82 must be the same. Under these conditions, tube 69 conducts and tube 70 is substantially non-conducting thus causing current to flow in primary winding 72 in such a manner that a voltage of positive polarity is induced at point 83 in the secondary winding 71. Thus, point 84 of motor winding 85 will be at the same voltage polarity as point 83. Due to the voltage polarity at point 84, the voltage in winding 85 will be in phase with the voltage now applied to motor winding 86 from voltage source 87. Thus, drive motor 50 will now rotate at a greater speed as a result of the positive feedback voltage and cause coincidence between the 40-degree gate pulse and the main reference pulse to occur at a much faster rate than would ordinarily be required without the positive feedback voltage.

Upon activation of relay 56 due to the coincidence between the 40-degree gate and the main reference pulse, the receiver goes into "fine" operation for a more accurate indication of bearing. Once the receiver is in "fine" operation, it is controlled by the output derived as a result of the phase comparison of the auxiliary reference pulses with the 135 cycle-per-second harmonic component. The output of the 135 cycle-per-second filter 26 is fed into phase comparator 47. In addition, the output of auxiliary signal separator 29 is fed into saw-tooth generator 37. The output of saw-tooth generator 37 is then fed into the 135 cycle filter network 45 which extracts an output wave having the same repetition frequency as the harmonic 135 cycle-per-second component. The output of filter 45 is fed into phase shifter 46. This phase shifted output which is continuously varied as the result of being coupled to the output of drive motor 50 through a nine-to-one reduction gear train 49, is fed directly into phase comparator 47. The output of phase comparator 47 is dependent upon the phase relation between the 135 cycle-per-second component and the auxiliary reference pulses. The phase between the 135 cycle-per-second component and the auxiliary reference pulses varies as the azimuth position of the aircraft changes. Thus, phase shifter 46 varies the signal derived from the auxiliary reference pulses in such a manner as to produce a "null" in the output of phase comparator 47. The output of phase comparator 47 is fed into motor control circuit 52 through contacts 61 and 64 of relay 56. Armature 44 of relay 56 in its energized position applies a ground to contact 55 of relay 56.

When the receiver is in "fine" operation, a negative feedback voltage is desired in order to produce a voltage which will stabilize the receiver system to eliminate "hunting" by decreasing the speed of the drive motor 50 as it approaches its "null" position. The negative feedback voltage is obtained when the following conditions are fulfilled. During "fine" operation, relay 56 is in its energized position. In this position, armature 44 applies a ground to contact 55. This ground is applied via line 89 to the primary of feedback transformer 34. At substantially the same time generator 38 applies a voltage to the center tap of feedback transformer 34, and due to transformer action in feedback transformer 34, voltage is applied to points 78' and 79'. The plate voltages to tubes 69 and 70 of motor control circuit 52 are applied from plate supply 80 to the center tap (point 82) of the primary winding 72 of transformer 73. In order to produce a condition of negative feedback, the polarity of the voltage at point 78' and at points 82 must be opposite. Under these conditions tube 69 is now substantially non conducting and tube 70 is conducting causing current to flow in the primary winding 72 in such a manner that voltage of a negative polarity is induced at point 83 in the secondary winding 71. Thus, point 84 of motor winding 85 will be at the same voltage polarity as point 83. Due to the potential at point 84, the voltage in motor winding 85 will now be out of phase with the voltage applied to drive motor winding 86 from voltage source 87. Thus drive motor 50 will now be reduced in speed as a result of this degenerative feedback voltage and will tend to pull in to its final "null" position without any overtravel.

Thus, a positive feedback voltage or a negative feedback voltage is obtained depending upon the position of armature of relay 56; more specifically, a positive feedback voltage is achieved when armature of relay 56 applies a ground to contact 54 and a negative feedback voltage is achieved when armature of relay 56 applies a ground to contact 55. Finally, the bearing indication of the receiver will then be read on bearing indicator 51 which is coupled directly to the output of generator 38.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a radio navigation receiver adapted to receive a complex signal including a fundamental wave, a harmonic wave, and spaced main and auxiliary reference pulses having predetermined repetition frequencies equal to the frequencies of said fundamental and harmonic waves, respectively, means to separate the aforementioned components of said complex signal so as to obtain a fundamental wave output, a harmonic wave output, a main reference pulse output, and an auxiliary reference pulse output, a bearing indicator means, a motor to control said bearing indicator means, a motor control means, first means coupled to said fundamental wave output and said main reference pulse output to produce a coarse signal, second means coupled to said harmonic wave output and said auxiliary reference pulse output to produce a fine signal, generator means driven by said motor having a first and a second output, switching means having first and second contact positions, said switching means coupling said coarse signal and said first output of said generator means in one of its contact positions to said motor control means and coupling said fine signal and said second output of said generator means in its other contact position to said motor control means, said motor control means producing a voltage to control the rotation of said motor.

2. A radio receiver according to claim 1 further including a phase shifter under control of said motor to vary the phase of said fundamental wave output, a gate pulse generator coupled to the output of said phase shifter, and a coincidence circuit coupled to the output of said gate pulse generator and said main reference pulse output to actuate said switching means upon coincidence of said gate pulse and said main reference pulse.

3. A radio navigation receiver according to claim 1 wherein said generator means includes a generator and a feedback transformer.

4. A radio navigation receiver according to claim 1 wherein said motor control means includes a first electron discharge device, a second electron discharge device and a first transformer connected between the plates of said first and second electron discharge devices so as to inductively couple the outputs of said first and second electron discharge devices to said bearing inductor motor.

5. In a radio navigation receiver adapted to receive a complex signal including a fundamental wave, a harmonic wave and spaced main and auxiliary reference pulses having predetermined repetition frequencies equal to the frequencies of said fundamental and harmonic waves, respectively, means to separate the aforementioned components of said complex signal so as to obtain a fundamental wave output, a harmonic wave output, a main reference pulse output and an auxiliary reference pulse output, a bearing indicator means, a motor to control said bearing indicator means, a motor control means, said motor having a first and a second winding, said first winding being energized from a source of sinusoidal voltage, said second winding being responsive to the output of said motor control means, first means coupled to said fundamental wave output and said main reference pulse output to produce a coarse signal, second means coupled to said harmonic wave output and said auxiliary reference pulse output to produce a fine signal, gating pulse producing means coupled to said fundamental wave output for producing a gating pulse, generator means having a first and a second output, switching means having first and second contact positions, said switching means in its first contact position coupling said coarse signal and said first output of said generator means to said motor control means so as to produce a voltage in said second winding which is in phase with the voltage of said first winding thus causing said motor to accelerate, said switching means responsive to coincidence between said gating pulse and said main reference pulse to switch from said first contact position to said second contact position, and said switching means in its second contact position coupling said fine signal and said second output from said generator means to said motor control means so as to produce a voltage in said second winding which is out of phase with the voltage of said first winding thus causing said motor to decelerate.

6. In a radio navigation receiver adapted to receive a complex signal including a fundamental wave, a harmonic wave, and spaced main and auxiliary reference pulses having predetermined repetition frequencies equal to the frequencies of said fundamental and harmonic waves, respectively, means to operate the aforementioned components of said complex signal so as to obtain a fundamental wave output, a harmonic wave output, a main reference pulse output and an auxiliary reference pulse output, a bearing indicator means, a motor to control said bearing indicator means, a motor control means, said motor having first and second windings, said first winding being energized from a source of sinusoidal voltage, said second winding being responsive to the output of said motor control means, said motor control means having a first electron discharge device connected to a second electron discharge device, a first transformer connected between the plates of said first and second electron discharge devices so as to inductively couple the outputs of said first and second electron discharge devices to said second winding of said motor, first means coupled to said fundamental wave output and said main reference pulse output to produce a coarse signal, second means coupled to said harmonic wave output and said auxiliary reference pulse output to produce a fine signal, gating pulse producing means coupled to said fundamental wave output for producing a gating pulse, a generator coupled to a feedback transformer producing a first and second output, switching means having first and second contact positions, said switching means in its first contact position coupling said coarse signal and said first output of said feedback transformer to said grids of said first and second electron discharge devices so as to produce a voltage from said first transformer which when fed to said second winding will be in phase with the voltage of said first winding thus causing said motor to accelerate, said switching means responsive to coincidence between said gating pulse and said main reference pulse to switch from said first contact position to said second contact position, said switching means in its second contact position coupling said fine signal and said second output from said feedback transformer to said grids of said first and second electron discharge devices so as to produce a voltage across said first transformer which when fed into said second winding will be out of phase with the voltage of said first winding thus causing said motor to decelerate.

7. In a radio navigation receiver adapted to receive a complex signal including a fundamental wave, a harmonic wave, and spaced main and auxiliary reference pulses having predetermined repetition frequencies equal to the frequencies of said fundamental and harmonic waves, respectively, means to separate the aforementioned components of said complex signal so as to obtain a fundamental wave output, a harmonic wave output, a main reference pulse output and an auxiliary reference pulse output, gating pulse producing means coupled to said fundamental wave output for producing a gating pulse of a given width, a first phase shifting means coupled to said fundamental wave output for shifting the relative phase between said gating pulse and said main reference pulse, a second phase shifting means coupled to the output of said auxiliary reference pulse output for shifting the relative phase between said auxiliary reference pulse and said harmonic wave, first phase comparison means coupled between the fundamental wave output and the main reference pulse output to compare the phase difference between said fundamental wave and said main reference pulse, second phase comparsion means coupled between the harmonic wave output and the auxiliary reference pulse, second phase comparison means coupled between said harmonic wave and said auxiliary reference pulse, a bearing indicator means, a motor to control said bearing indicator means, a motor control means, said motor having a first and second winding, said first winding being energized from a source of sinusoidal voltage, said second winding being responsive to the output of said motor control means, said motor control means including a first electron discharge device connected to a second electron discharge device, a first transformer connected between the plates of said first and second electron discharge devices so as to inductively couple the outputs of said first and second electron discharge devices to said second winding of said motor, a generator coupled to a feedback transformer having a first and second output, coincidence means coupled to said separating means to detect the coincidence between said gating pulse and said main reference pulse, switching means having first and second contact positions, said switching means in its first contact position coupling the output of said first phase comparison means and said first output of said feedback transformer to said grids of said first and second electron discharge devices so as to produce a voltage from said first transformer which when fed into said second winding will be in phase with the voltage of said first winding thus causing said motor to accelerate, said switching means responsive to said coincidence means to switch from said first contact position to said second contact position, said switching means in its second contact position coupling said first output of said second phase comparing means and said second output of said feedback transformer to said grids of said first and second electron discharge devices so as to produce a voltage from said first transformer which when fed into said second winding will be out of phase with the voltage of said first winding thus causing said motor to decelerate.

8. In a radio navigation receiver adapted to receive a complex signal including a fundamental wave, a harmonic wave, and spaced main and auxiliary reference pulses having predetermined repetition frequencies equal to the frequencies of said fundamental and harmonic waves, respectively, means to separate the aforementioned components of said complex signal so as to obtain a fundamental wave output, a harmonic wave output, a main reference pulse output, and an auxiliary reference pulse output, a bearing indicator means, a motor to control said bearing indicator means, a motor control means, first means coupled to said fundamental wave output and said main reference pulse output to produce a coarse signal, second means coupled to said harmonic wave output and said auxiliary reference pulse output to produce a fine signal, generator means driven by said motor having a first and a second output, switching means having first and second switching states, said switching means coupling said coarse signal and said first output of said generator means in one of its switching states to said motor control means and coupling said fine signal and said second output of said generator means in its other switching state to said motor control means, said motor control means producing a voltage to control the rotation of said motor.

9. In a radio navigation receiver adapted to receive a complex signal including a fundamental wave, a harmonic wave, and spaced main and auxiliary reference pulses having predetermined repetition frequencies equal to the frequencies of said fundamental and harmonic waves, respectively, means to separate the aforementioned components of said complex signal so as to obtain a fundamental wave output, a harmonic wave output, a main reference pulse output, and an auxiliary reference pulse output, a bearing indicator means, a motor to control said bearing indicator means, first means coupled to said fundamental wave output and said main reference pulse output to produce a coarse signal, second means coupled to said harmonic wave output and said auxiliary reference pulse output to produce a fine signal, generator means driven by said motor having a first and second output, switching means having first and second switching states, said switching means coupling said coarse signal and said first output of said generator means in one of its switching states to said motor and coupling said fine signal and said second output of said generator means in its other switching state to said motor to control the rotation of said motor.

10. In a radio navigation receiver adapted to receive a complex signal including a fundamental wave, a harmonic wave, and spaced main and auxiliary reference pulses having predetermined repetition frequencies equal to the frequencies of said fundamental and harmonic waves, respectively, means to separate the aforementioned components of said complex signal so as to obtain a fundamental wave output, a harmonic wave output, a main reference pulse output, and an auxiliary reference pulse output, a bearing indicator means, a motor to control said bearing indicator means, first means coupled to said fundamental wave output and said main reference pulse output to produce a coarse signal, second means coupled to said harmonic wave output and said auxiliary reference pulse output to produce a fine signal, generator means driven by said motor and switching means having first and second switching states, said switching means in one of its switching states coupling said coarse signal to said motor to drive said motor and also coupling said generator to said motor in a direction to accelerate said motor, said switching means in the other of its switching states coupling said fine signal to said motor to drive said motor and also coupling said generator means to said motor in a direction to decelerate said motor.

11. In a receiver adapted to receive a complex signal and to derive therefrom a coarse and a fine signal, a motor, generator means driven by said motor, and switching means having first and second switching states, said switching means in one of its switching states coupling said coarse signal to said motor to drive said motor and also coupling said generator to said motor in a direction to accelerate said motor, said switching means in the other of its switching states coupling said fine signal to said motor to drive said motor and also coupling said generator means to said motor in a direction to decelerate said motor.

12. In a receiver adapted to receive a complex signal and to derive therefrom two control signals, a motor, generator means driven by said motor and switching means having first and second switching states, said switching means in one of its switching states coupling one of said control signals to said motor to drive said motor and also coupling said generator means to said motor in a direction to accelerate said motor, said switching means in the other of its switching states coupling the other of said control signals to said motor to drive said motor and also coupling said generator means to said motor in a direction to decelerate said motor.

13. In a system providing a coarse and a fine signal, a motor, generator means driven by said motor, and switching means having first and second switching states, said switching means in one of its switching states coupling said coarse signal to said motor to drive said motor and also coupling said generator to said motor in a direction to accelerate said motor, said switching means in the other of its switching states coupling said fine signal to said motor to drive said motor and also coupling said generator means to said motor in a direction to decelerate said motor.

14. In a system having two sources of voltage, a motor, generator means driven by said motor, and switching means having first and second switching states, said switching means in one of its switching states coupling one of said sources to said motor to drive said motor and also coupling said generator means to said motor in a direction to accelerate said motor, said switching means in the other of its switching states coupling the other of said sources to said motor to drive said motor and also coupling said generator means to said motor in a direction to decelerate said motor.

No references cited.